MEMORY APPARATUS AND METHOD

Filed June 21, 1965 3 Sheets-Sheet 1

INVENTOR
WILLIAM W. DAVIS
BY Thomas J. Nikolai
ATTORNEY

June 4, 1968 W. W. DAVIS 3,387,274

MEMORY APPARATUS AND METHOD

Filed June 21, 1965 3 Sheets-Sheet 2

3,387,274
Patented June 4, 1968

3,387,274

MEMORY APPARATUS AND METHOD

William W. Davis, Minneapolis, Minn., assignor to Sperry Rand Corporation, New York, N.Y., a corporation of Delaware Filed June 21, 1965, Ser. No. 465,461
5 Claims. (Cl. 340—172.5)

ABSTRACT OF THE DISCLOSURE

A Search memory system performing the search function block-by-block in a multiblock Search memory system.

The block search processor proposed by the present invention forms a portion of a memory system generally described as an associative memory. Such associative memory systems are well known and may be broadly defined as a memory system in which the stored information is accessed by the comparison of a known datum word to a part of or to the whole of stored information. Associative memories have been given various names depending upon the author's background, i.e., tag memory, content addressable memory, recognition memory, etc., but for purposes of the present invention an associative memory shall be as defined above. In accordance with all known definitions, an associative memory may be considered as being composed of two basic memories, or subsystems; a Search memory and an associated memory. The Search memory is that portion of the associative memory that contains the descriptive criteria, search memory words, or designator words that are to be compared with the datum word, or search word; while the associated memory contains the data that are particularly associated with the descriptive criteria stored in the Search memory. Stated another way; the Search memory may contain a plurality of multibit words that describe and are individually related to other individual multibit words that are stored in the associated memory; the multibit search word is compared with the search memory words, as for example where the search function is defined as "locate all the search memory words that are equal to the search word"; the Search memory provides an output signal indicative of the address in the associated memory in which the associated data, i.e., the data associated with the particular search memory word, is located; and, the associated memory is accessed for the associated data, i.e., the data in the associated memory that are associated with the search memory word that satisfied the search criteria.

An associative memory may take many forms. Broadly speaking, a central processor and a plurality of magnetic tape handlers form an associative memory in that the central processor provides, under programmed instructions through its input/output section, a search function to one or more tape handlers, as for example instructing a certain one of the tape handlers to move its tape to a certain block of information. The block on the magnetic tape may have binary coded block designators that are read out from the passing tape at high speed and are compared in the central processor to the desired block designator. When the central processor finds a match, i.e., when the passing block designator on the magnetic tape is found to be equal to the desired block designator held in the central processor, the central processor instructs the tape handler to stop and the information on the magnetic tape that is associated with the determined block designator may then be read out at low speed and processed as desired. In this form the desired block designator is analogous to the search word, the block designators on the moving magnetic tape are analogous to the designator words and the information following the particular block designators on the magnetic tape are analogous to the data in the associated memory. Additionally, central processor look-up table procedures under programmed instructions perform as an associative memory. To the other extreme there have been postulated random-access electrically-alterable systems in which the associative memory has no associated memory that is separate from the Search memory; i.e., the Search memory and the associated memory are merged in one memory system in which the designator words are merely a tag forming a first part of a two-part word in which the associated data word froms the second part. In this system then, there is no requirement for encoding, address selection, or decoding to move from the Search memory into the associated memory as is required in other systems.

The present system is directed toward a Search memory system in which the Search memory is broken down into a plurality of equal size blocks in which the search function is simultaneously performed on all the words in a designated block, the search function results are then detected and any designated operation is processed, a second designated block is then searched, the search function results are then detected and any designated operation is performed, and so forth through the Search memory. The arrangement so provided permits a savings in sense amplifiers and match logic detectors as compared to prior art arrangements.

As prior art arrangements require a separate sense amplifier and match logic detector for each designator word held in the Search memory, the present invention provides a reduction in the required number of sense amplifiers and match logic detectors that is an inverse function of the number of blocks into which the Search memory is divided. That is, in a prior art Search memory of 16,384 designator words there would be required 16,384 sense amplifiers and 16,384 match logic detectors. If such Search memory were divided into 128 blocks of 128 designator words (128 block×128 designator words per block=16,384 designator words) there would be required only 128 sense amplifiers and 128 match logic detectors. The only additional hardware required to implement this savings would be the addition of a block count register to hold the number of the designated block and a block translator that would, under control of the block count register, couple the search register to the designated block.

Accordingly, it is a primary object of the present invention to provide an associative memory system having a Search memory portion and an associated memory portion in which the Search memory portion is searched in blocks.

It is another object of the present invention to provide a Search memory having a plurality of equal sized blocks in which the search operation consists of a block-by-block search.

It is a further object of the present invention to provide a Search memory having a plurality of blocks, each block having an equal number of designator words, each designator word having an equal number of bits, in which each output line is coupled to all the like ordered designator words of all blocks wherein the number of required sense amplifiers and match logic detectors is reduced to the number of words per block rather than the number of words per Search memory.

It is a more general object of the present invention to provide a Search memory having substantially reduced sense amplifier and match logic detector requirements over prior art systems.

These and other more detailed and specific objects will be disclosed in the course of the following specification, reference being had to the accomapnying drawings, in which.

Figures 1, 2:
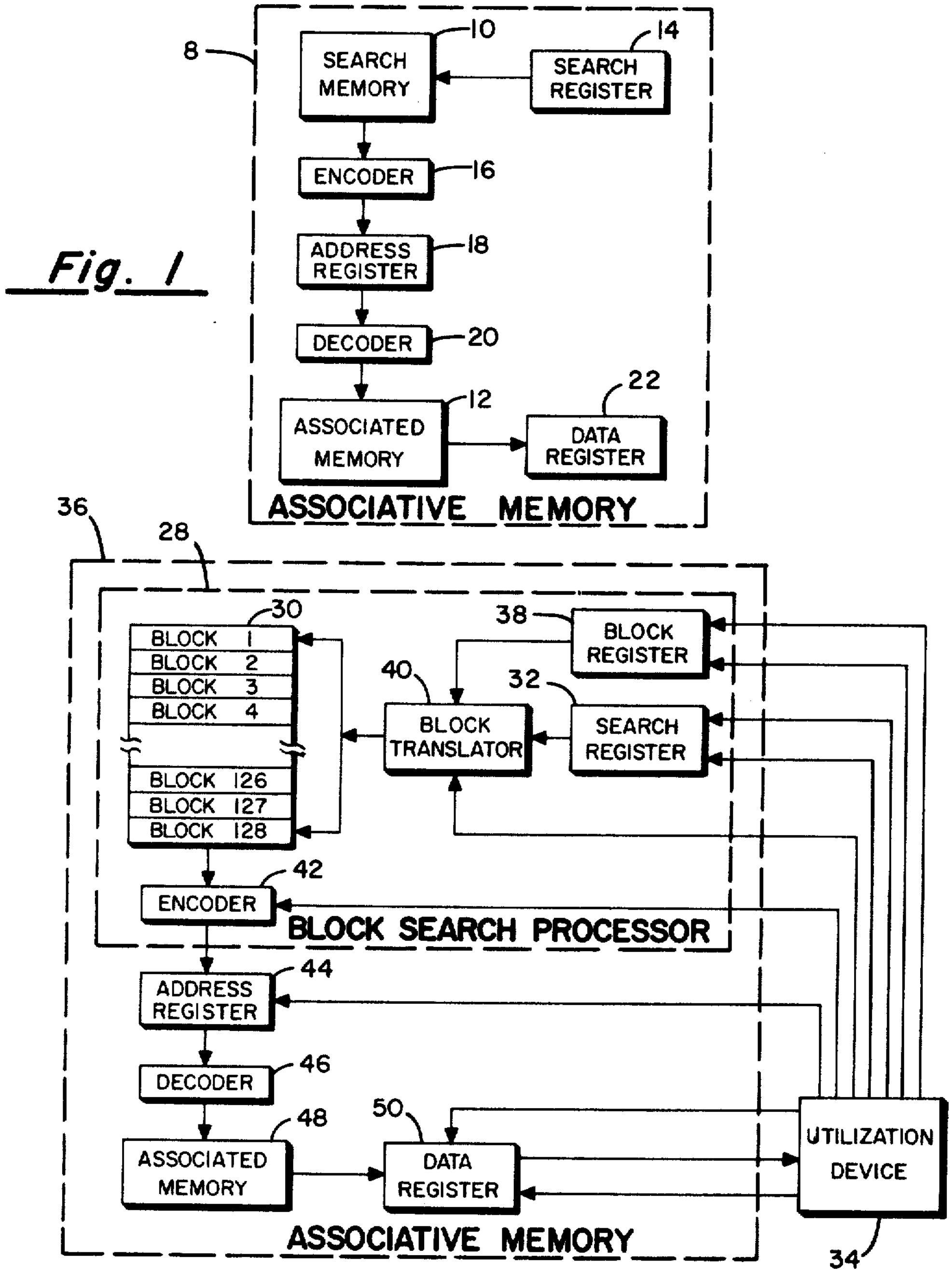
FIG. 1 is an illustration of a block diagram of an associative memory system as contemplated by the present invention.
FIG. 2 is a block diagram of an associated memory system including a block search processor as contemplated by the present invention.

With particular reference to FIG. 1 there is illustrated a block diagram of a logical configuration of an associative memory system 8 having two primary portions designated the Search memory 10 and the associated memory 12. As stated hereinbefore, search register 14 holds the search word, i.e., the multibit word that is to be compared to the contents of Search memory 10, having all its respective ordered bits separately coupled to the like ordered bits of the designator words held in Search memory 10. The Search memory 10 of FIG. 1 may be of any well known arrangement including those disclosed in Patent No. 3,076,958 and Patent No. 3,155,-945 and that of the article "A 300 Nanosecond Search Memory" C. A. Rowland and W. O. Berge, Proceedings—Fall Joint Computer Conference, 1963, pp. 59–65 and the article "A Search Memory Subsystem For A General-Purpose Computer," A. Kaplan, Proceedings—Fall Joint Computer Conference, 1963, pp. 193–200.

A typical search operation consists of a comparison of the bits of the search word held in search register 14 to the designator words held in Search memory 10 providing at the output of Search memory 10 signals representative of those designator words that satisfy the search criteria established by the Search memory. Search memory 10 output signals are then coupled to an encoder 16 that receives such signals and encodes them into a coding indicative of the address in the Search memory of the designator words that have satisfied the search criteria. Encoder 16 in turn provides output signals to address register 18 wherein there are stored the data representative of the above mentioned addresses. For access to associated memory 12, decoder 20 decodes the data held in register 18 addressing in associated memory 12 that data associated with the address held in address register 18 which as discussed above is particularly associated with the designator word of Search memory 10 that satisfied the criteria of the search function previously performed. Data register 22 performs the function of providing communication between the associated memory 12 and the external world.

As discussed hereinabove many associative memory system organizations have been proposed but it is believed that the arrangement of FIG. 1 is broad enough to encompass the operation of any known proposed system. That is, as previously discussed, Search memory 10 may be a random-access electrically-alterable core memory for performing the desired search functions while associated memory 12 may consist of a plurality of magnetic tape handlers, disc files, magnetic drums, etc. Accordingly, encoder 16, address register 18 and decoder 20 are the means whereby the matched designator words communicate with and select the associated data held in the associated memory. Additionally, Search memory 10 and associated memory 12 may be merged in one random-access electrically-alterable core memory in which the designator words are merely first portions of a two-portion word, the second portion of which is the associated word that could be held in a separate associated memory.

With particular reference to FIG. 2 there is illustrated a block diagram of an arrangement incorporating the block search processor 28 of the present invention in which Search memory 30 is broken down into a plurality of blocks. For purposes of the present discussion assume that Search memory 30 is divided into 128 blocks, block 1 through block 128, that each block has a capacity of 128 designator words and that each designator word has a word length of 30 binary digits, or bits. Accordingly, each block has 30 associated digit lines, each digit line being coupled to all the like ordered bits of each of the 128 designator words of that block. As an example assume that the designator words and the search word have an equal number of ordered bits of the general form $$D_{m-1}, D_{m-2} \ldots D_1, D_0$$

where $D_{m-1}$ is the highest ordered bit and $D_0$ is the lowest ordered bit, and that each block has an equal number of ordered designator words DW–1 through DW–128. Then the first ordered digit line of block 1 would couple all the first like-ordered bits, say $D_{m-1}$, of designator words DW–1 through DW–128; the second ordered digit line of block 1 would couple all the next like-ordered-bits, say $D_{m-2}$, of designator words DW–1 through DW–128; and so forth through block 1. Additionally, each separate block has a separate complete set of ordered digit lines as discussed with respect to block 1.

Further, assume that the search function is bit-serial, i.e., each bit of the 30-bit search word that is held in search register 32 is compared bit-by-bit to each like ordered bit of the 30-bit designator words held in Search memory 30. Operation of block search processor 28 of FIG. 2 is initiated by utilization device 34 providing the necessary preconditioning and control signals to associative memory 36, which preconditioning would include the master clearing of all registers to contain all "0"s. Next, the desired search word would be inserted in search register 32 and the desired block count would be inserted in block count register 38. At this time search register 32 and block count register 38 couple their respective output signals to block translator 40 that translates such signals thereby coupling those signals representative of the bits of the search word held in search register 32 to the respectively ordered digit drive lines of the block designated by the block count held in block count register 38.

Next, block translator 40 is enabled initiating the bit-serial search operation in the designated block of Search memory 30. Encoder 42 receives the word line signals from Search memory 30 providing the match logic thereon. After completion of the search operation encoder 42 is enabled causing it to emit signals representative of the addresses in the searched block of Search memory 30 that have satisfied the particular search function criteria established by utilization device 34. Encoder 42, address register 44 and decoder 46 selectively, under control of utilization device 34, address associated memory 48 coupling the data words stored in associated memory 48 to data register 50 as designated by the match logic of encoder 42. Upon completion of the processing of the data words from associated memory 48 through data register 50 and into utilization device 34, utilization device 34 may then provide proper control signals to initiate another search function upon a different block number as designated block count register 38.

Assuming that the next subsequent block number is to be searched, utilization device 34 may couple a decrement-one signal to block count register 38 thereby decreasing the block number contained therein by one. As before, utilization device 34 then couples an enable signal to block translator 40 which again initiates a bit-serial search upon the block next designated by the contents of block count register 38. Encoder 42 again receives the match signals emitted by the searched block performing the designated match logic thereupon and storing such matched logic results for subsequent readout and coupling to address register 44. For a more detailed discussion of the operation of match logic detectors as used in conjunction with a Search memory, recourse to the following copending applications, all assigned to the same assignee as is the present invention, may be had: ERA-1259, Signal Responsive Apparatus, Ser. No. 413,730, filed Nov. 25, 1964 now Patent No. 3,321,643 issued May 23, 1967; ERA-1066, Memory Device and Apparatus, Ser. No. 367,121, filed May 13, 1964; ERA-907, Signal Responsive Apparatus, Ser. No. 231,172, filed Oct. 17, 1962 now Patent No. 3,222,645 issued Dec. 7, 1965; ERA-1082, Discrimination, Logic and Memory Devices, Ser. No. 356,478, filed Apr. 1, 1964; ERA-1024, Thin Film Detector, Ser. No. 360,317, filed Apr. 16, 1964; ERA-1070, Memory Apparatus and Method, Ser. No. 378,151, filed June 26, 1964; and ERA-1117, Detector System and Device, Ser. No. 384,885, filed July 24, 1964.

Figures 3, 4A, 4B, 4C, 4D, 4E:
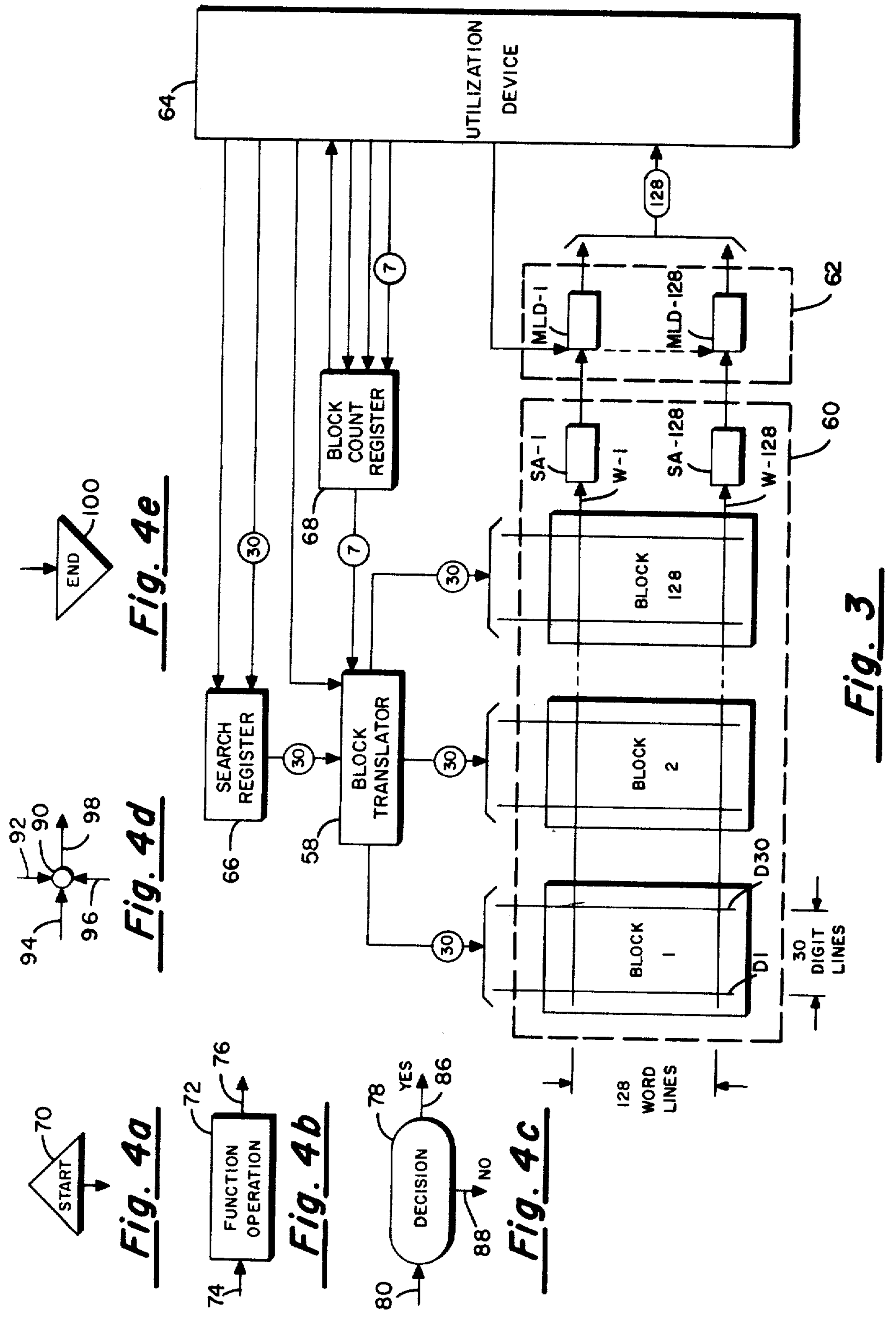
FIG. 3 is a block diagram illustrating the block-by-block search concept of the block search processor of the present invention.
FIG. 4a–FIG. 4e illustrate the various flow diagram symbols utilized in FIG. 5.

With particular respect to FIG. 3 there is illustrated a preferred embodiment of the present invention related to the embodiment of FIG. 2 but illustrating in more detail a Search memory 60 incorporating the block search concept of the present invention. As with FIG. 2, Search memory 60 is comprised of 128 similar blocks each block consisting of 128 30-bit words. For purposes of the present illustration the word lines, i.e., the serially intercoupled lines coupling all the bits of a like ordered designator word of each block, lines W-1 through W-128, are coupled to a corresponding sense amplifier SA-1 through SA-128, respectively. The sense amplifiers are in turn coupled to corresponding match logic detectors MLD-1 through MLD-128 in an encoder 62 whose outputs are coupled to a utilization device 64 which for purposes of the present discussion can be assumed to include an associated memory and the necessary addressing electronics. Although the illustrated embodiment depicts each word line W-1 through W-128 as serially intercoupling all like ordered designator words of each block it is apparent that such arrangement is not to be construed as a limitation thereto. As each block is separately gated by external electronics as will be discussed below, it is apparent that the like ordered word line of each block may be intercoupled serially to that of another block or the like ordered word lines of all blocks may be coupled in parallel with their common junction in turn coupled to their respective sense amplifier. Any internal coupling arrangement is permissible whereby the arrangement is such as to permit the use of only one sense amplifier per word line. Accordingly, in the illustrated embodiment there would be 128 sense amplifiers coupled to the parallel or serially intercoupled like ordered word lines W-1 through W-128 of blocks 1 through 128 of Search memory 60.

It is contemplated by the present invention that the block search processor be utilized in conjunction with a utilization device including a stored program computer. A program may be defined generally as the plans for the solution of a specified problem. A complete program includes plans for description of data, coding of instructions for the computer, and plans for the utilization of the results by the system which is to be responsive to the results. The primary object of programming is the achievement of an acceptable plan or process for the solution of a specified problem. Another subsidiary object of programming is to arrive at a listing of coded instructions which direct each step that the computer is to perform and the solution of the specified problem. Such a list of coded instructions is referred to a sa "program" or a "routine." In other words, it can be said that programming consists of the planning and design for the solution of a problem which includes ultimately the coding of individual computer instructions in a predetermined order such that the solution of the problem as planned can be implemented. The overall planning includes analysis of the data to be supplied, a system analysis, specification of various output data formats, the relationship of the computer to the connected external equipment, and planning for the integration of the computer operation into an overall system.

In programming, as in other forms of designs, it is desirable to have a distinct symbology whereby the steps in the solution of a problem may be shown pictorially.

The flow diagram symbols utilized in this specification are illustrated in FIGS. 4*a* through 4*e* and will be described individually below. It should be understood that the flow diagrams generated in the course of a problem solution will vary from a very high level statement of desired result type of diagram, down to flow diagrams that illustrate the various steps to be performed in their logical order in the implementation of a solution.

The flow diagram Start symbol 70 illustrated in FIG. 4*a* is utilized to indicate the starting point of a particular sequence of flow diagram operations.

The flow diagram Function Operation symbol 72 illustrated in FIG. 4*b* is utilized to describe one step in the solution of a problem. Box 72 normally will contain a statement of the function to be accomplished, and illustratively may be a statement of a single computer instruction, or a statement of a higher ordered function. Each of these function operation boxes will normally contain an input 74 and an output 76 which will respectively indicate the steps preceding the operation of the function and the step to follow the operation of the function. The amount of detail of the descriptive matter contained in the function operation box would depend upon the level of the solution of the problem that the particular flow diagram is intended to represent.

The flow diagram Decision symbol 78 illustrated in FIG. 4*c* is utilized to indicate when a decision must be made. The decision symbol 78 will normally have one line of input 80 but will have two lines of output 86 and 88, to represent respectively the alternatives Yes, and No, respectively, in a decision. Within the symbol will be stated a question to be answered by the decision element, and this question normally is stated such that it can receive a "Yes" or a "No" answer to correspond to the alternative paths of output. This statement of the question to be answered can be of a type illustrating a single computer instruction, or it may be a higher level system decision, the choice depending upon the nature of the particular flow diagram under consideration.

The flow diagram Junction Box symbol 90 illustrated in FIG. 4*d* consists of the method of illustrating the junction 90 of several input lines which are illustratively shown as 92, 94 and 96. A single resultant or output line 98 is utilized as an input to that particular flow diagram symbol that would normally follow in the problem solution, and would be one of the types described above. This method of joining input lines alleviates the problem of having several lines coming together at a symbol boundary. The number of input lines shown is intended to be illustrative only and it will usually be found that any number of entries to a flow diagram element may be made.

The flow diagram End symbol 100 illustrated in FIG. 4*e* is utilized to designate the end of a particular sequence of flow diagram operations.

With particular reference to the logic diagram symbology described above the illustrated embodiment of FIG. 3 will now be discussed with respect to the flow diagram of FIG. 5. Initially the search operation is started by utilization device 64 coupling appropriate signals to search register 66 and block count register 68, master clearing the registers associated therewith as designated by Function Operation block 110 of FIG. 5. Next, utilization device 64 initiates the operation designated by Function Operation block 112 in which the search word is stored in search register 66. Next, utilization device 64 initiates the operation designated by Function Operaton block 114 in which the block count is loaded into block count register 68. At this time the signals representative of the search word that is stored in search register 66 are coupled to block translator 58 as are the signals representative of the block count held in block count register 68. The actual search operation is then initiated by the program signal flowing through Junction Box 116 initiating the operation of function box 118 wherein block translator 58 is enabled. Block translator 58 is enabled by the coupling of an appropriate enable signal thereto from utilization device 64 whereby block translator 58 bit-serially couples the signals representative of the bits of the search word held in search register 66 to the respectively ordered digit drive lines of the designated block. As an example of the above, assume that block count register 68 holds the block count 0000001 designating block 1. Accordingly, the signal representations of the search word in search register 66 are bit-serially coupled from the highest to the lowest ordered digit line of block 1.

Figure 5:
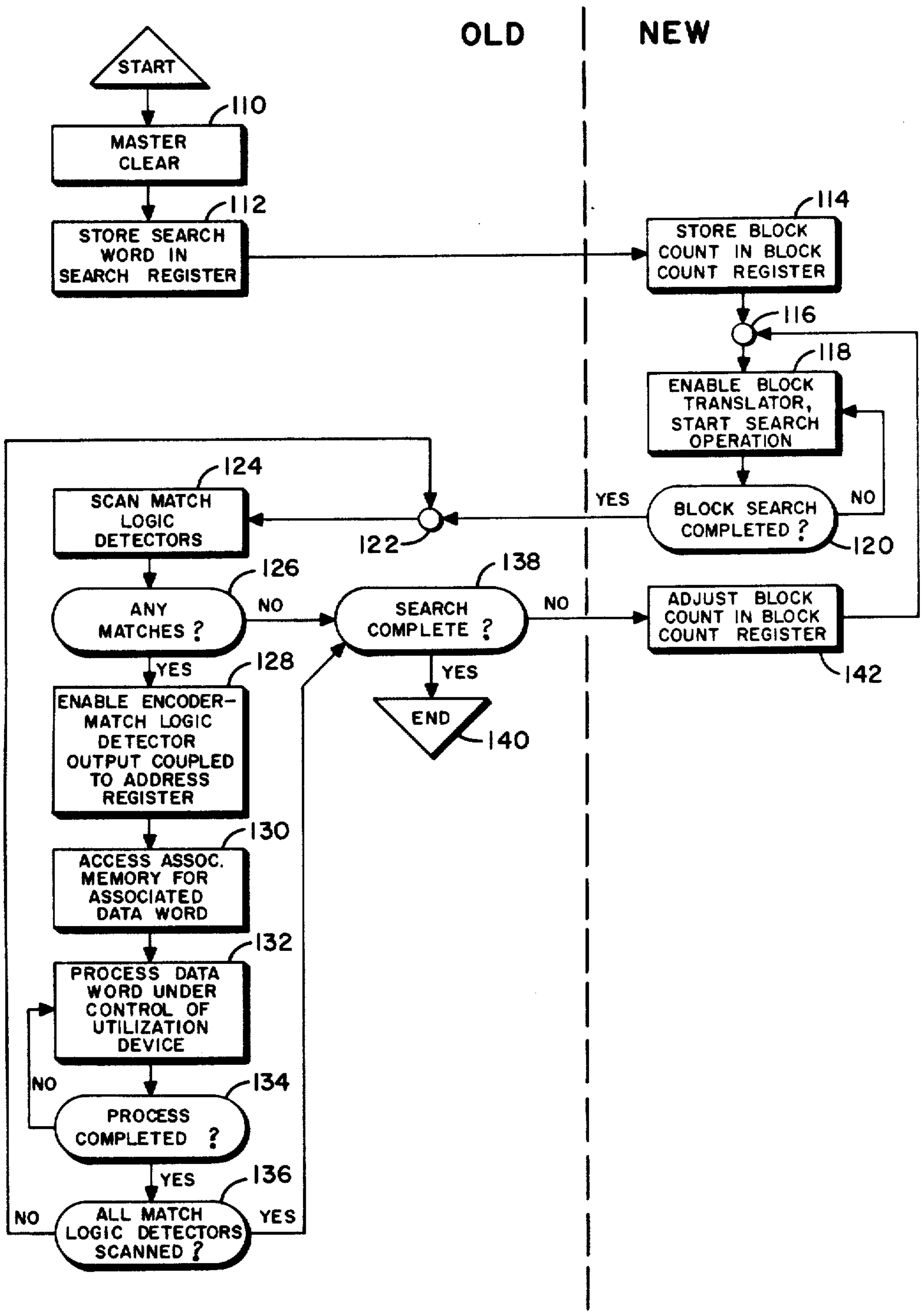
FIG. 5 is a flow diagram of a search operation as illustrated in FIG. 3.

When the Decision block 120 of FIG. 5 indicates that the block search has been completed the program flows through Junction Box 122 and then to Function Operation block 124 which represents the operation whereby utilization device 64 scans match logic detectors MLD–1 through MLD–128 for the determination of any matches rendered during the prior search operation as represented by Decision block 126. Assuming that one or more matches has been determined during the scanning and decision operations of blocks 124 and 126, utilization device 64 then performs the operations represented by Function Operation blocks 128, 130 and 132. After the completion of the operation upon each particular match located in the match logic detectors of encoder 62 the operation represented by Decision block 134 is performed for the determination of whether or not the specified process or operation upon the particular data word under examination is completed.

Upon completion of the process upon the particular data word in question as designated by the address in the associated memory representative of the particular match logic detector of encoder 62 as performed by utilization device 64, the program flows next to Decision block 136 in which it is determined whether or not all match logic detectors have been scanned and if not, the program flows back to Junction Box 122 with the previous operations repeated until Decision block 136 produces a Yes condition.

At this time the program flows to Decision block 138. Decision block 138 asks the question "Is the search operation upon the search word stored in search register 66 complete?" If the answer is Yes, the program flows to End block 140 wherein the search operation is indicated as being complete. However, if Decision block 138 achieves a No condition, e.g., that is, the search is not complete and that an additional block is to be searched, the program flows through Function Operation block 142 indicating the function whereby utilization device 64 couples an appropriate block count adjust signal to block count register 68 adjusting the block count in block count register 68 appropriately. Upon the proper adjustment of the block count in block count register 68 the program flow returns to Junction box 116 whereby the previously discussed program operation is initiated.

Returning to Decision block 126 wherein the search operation upon the particular word in search register 66 has been completed and the match logic detectors of encoder 62 have been scanned as exemplified by Function Operation block 124, if there had been no matches during such search operation exemplified by a No decision from Decision block 126 the program flow would have been to Decision block 138 wherein as discussed hereinabove the program flow would be to End block 140 if the search operation were complete or to Function Operation block 142 for an adjustment of the block count in block count register 68 if the search had not been complete. Thus, there has been described with particular respect to FIGS. 3 and 5 a typical operation of a block search processor incorporating the inventive concept of the present invention in which a Search memory has been searched block-by-block under control of a utilization device whereby there has been utilized only one sense amplifier and one match logic detector per word (sense) line effecting a substantial savings in the electronics over that of prior art systems.

It is understood that suitable modifications may be made in the structure as disclosed provided such modifications come within the spirit and scope of the appended claims. Having now, therefore, fully illustrated and described my invention, what I claim to be new and desired to protect by Letter Patent is set forth in the appended claims.

1. A block search processor, comprising:
a Search memory comprising a plurality of blocks, each block having an equal number of ordered designator words, each of said designator words having an equal number of ordered bits;
block translator means;
a search register for holding a search word of a number of ordered bits equal to that of said designator words and for coupling signal representations of said search word to said block translator means;
a plurality of ordered digit lines each coupling only the like ordered bit of all of the designator words of only one block;
a plurality of groups of parallel-intercoupled-like ordered word lines each word line of each group only coupling bits of the like ordered designator word of each block;
a block count register for holding a block count representative of the block to be searched and for coupling signal representations of said block count to said block translator means;
means enabling said block translator means for coupling the ordered signal representations of the search word to the corresponding ordered digit lines of the block specified by the block count that is held in the block count register;
a plurality of sense amplifiers;
each of said groups of word lines coupled at its intercoupled end to a separate sense amplifier for providing an output signal representative of the result of the comparison of the search word to the designator word associated therewith.

2. A block search processor, comprising:
a Search memory comprising a plurality of blocks, each block having an equal number of ordered designator words, each of said designator words having an equal number of ordered bits;
a search register for holding a search word of a number of ordered bits equal to that of said designator words;
a plurality of ordered digit lines each coupling only the like ordered bit of all of the designator words of only one block;
a plurality of ordered word lines each only coupling bits of the like ordered designator words of all blocks;
a block count register for holding a block count representative of a block to be searched;
a block translator for coupling ordered signal representations of the search word to the corresponding ordered digit lines of the block specified by the block count that is held in the block count register;
a like plurality of sense amplifiers and match logic detectors;
each of said word lines coupled to a separate sense amplifier and a separate match logic detector for providing output signals representative of the result of the comparison of the search word to the designator word associated therewith.

3. A block search processor, comprising:
a Search memory comprising B blocks, each block having an equal number W of ordered designator words, each of said designator words having an equal number of ordered bits of the form $$D_{m-1}, D_{m-2}, \ldots D_1, D_0$$

where $D_{m-1}$ is the highest ordered bit and $D_0$ is the lowest ordered bit;

W word lines, each coupling all of the bits of all of the like ordered designator words of all of the blocks;

each of said word lines coupled to a separate set of a match logic detector and a sense amplifier for providing an output signal representative of the information content of the respectively associated designator word;

a search register for holding a search word of a form similar to said designator words;

a block count register for holding a block count representative of the block to be searched;

block translator means for coupling signal representations of the search word from the search register to the block designated by the block count in the block register.

4. A block search processor, comprising:

a Search memory comprising B blocks, each block having an equal number of ordered designator words, each of said designator words having an equal number of ordered bits of the form $$D_{m-1}, D_{m-2}, \ldots D_1, D_0$$

where $D_{m-1}$ is the highest ordered bit and $D_0$ is the lowest ordered bit;

W word lines, each coupling all of the bits of all of the like ordered designator words of all blocks;

each of said word lines coupled to a separate sense amplifier for providing an output signal representative of the information content of the respectively associated designator word;

a block translator;

a search register coupled to said block translator for holding a search word of a form similar to said designator words;

a block count register coupled to said block translator for holding a block count representative of the block to be searched;

means enabling said block translator for coupling signal representations of the search word from the search register to the block designated by the block count in the block register.

5. A block search processor, comprising:

a Search memory comprising a plurality of blocks, each block having an equal number of ordered designator words, each of said designator words having an equal number of ordered bits;

a plurality of sense amplifiers, each respectively associated with and coupling all of the like ordered designator words of all of the blocks;

a block translator;

a search register for holding a search word of a form similar to said designator words and coupled to said block translator;

a block register for holding a block count representative of the block to be searched and coupled to said block translator;

said block translator coupling the signal representations of the search word from the search register to the block designated by the block count in the block register for causing the respectively associated sense amplifiers to provide an output signal representative of the comparison of the search word to the designator word associated therewith.

References Cited

UNITED STATES PATENTS

| | | | |
|---|---|---|---|
| 3,131,291 | 4/1964 | French | 235—61.11 |
| 3,245,052 | 4/1966 | Lewin | 340—173 |
| 3,295,110 | 12/1966 | Brick | 340—172.5 |
| 3,297,995 | 1/1967 | Koerner | 340—172.5 |

ROBERT C. BAILEY, *Primary Examiner.*

I. KAVRUKOV, *Assistant Examiner.*